(12) United States Patent
Prater et al.

(10) Patent No.: US 6,758,980 B2
(45) Date of Patent: Jul. 6, 2004

(54) LIQUID FILTER WITH SEPARATE AND CALIBRATED VAPOR RELEASE

(75) Inventors: Ted Franklin Prater, Sparta, TN (US); Zemin Jiang, Cookeville, TN (US); John Scheuren, Brentwood, TN (US); John W. Clevenger, Jr., Antioch, TN (US); Barry M. Verdegan, Stoughton, WI (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 10/700,211

(22) Filed: Nov. 3, 2003

(65) Prior Publication Data
US 2004/0094459 A1 May 20, 2004

Related U.S. Application Data

(63) Continuation of application No. 10/116,461, filed on Apr. 4, 2002, now Pat. No. 6,641,742, which is a continuation-in-part of application No. 09/934,576, filed on Aug. 22, 2001, now Pat. No. 6,610,198.

(51) Int. Cl.[7] .............................................. B01D 35/143
(52) U.S. Cl. .................. 210/767; 210/132; 210/90; 210/120; 210/443; 116/268
(58) Field of Search .................. 210/94, 95, 130, 210/132, 85, 86, 133, 437, 440, 456, 90, 120, 429, 430, 431, 443, 484, 488; 116/276, 268

(56) References Cited

U.S. PATENT DOCUMENTS

| | | |
|---|---|---|
| 2,748,949 A | 6/1956 | James |
| 2,843,268 A | 7/1958 | Kennedy |
| 2,919,807 A | 1/1960 | Briggs |
| 3,209,520 A | 10/1965 | McKinlay |
| 3,386,230 A | 6/1968 | Reisberg et al. |
| 3,397,793 A | 8/1968 | MacDonnell |
| 3,506,475 A | 4/1970 | MacDonnell |
| 3,827,566 A | 8/1974 | Ponce |
| 4,033,881 A | 7/1977 | Pall |
| 4,058,463 A | 11/1977 | Bartik |
| 4,104,170 A | 8/1978 | Nedza |
| 4,181,514 A | 1/1980 | Lefkowitz et al. |

(List continued on next page.)

FOREIGN PATENT DOCUMENTS

| | | |
|---|---|---|
| EP | 048310 | 3/1982 |
| EP | 0470485 | 2/1992 |
| EP | 0631803 | 1/1995 |
| EP | 0711588 | 5/1996 |
| EP | 0844013 | 5/1998 |
| JP | 11253706 | 9/1999 |
| WO | WO 00/12195 | 3/2000 |

*Primary Examiner*—Terry K. Cecil
(74) *Attorney, Agent, or Firm*—Andrus, Sceales, Starke & Sawall, LLP

(57) ABSTRACT

A liquid filter (10) housing an annular filter element (16) has an annular space or inlet chamber (24) between the filter element and the housing and viewable through the housing such that an operator can see the level of liquid in the inlet chamber as an indication of when to replace the filter element, the higher the level of liquid in the inlet chamber the greater the pressure drop across the filter element. A change interval plugging indicator (102), preferably part of the filter element, is provided by a gas trap and pressure responsive release mechanism (104) trapping gas in the upper section (23) of the inlet chamber until a designated release pressure is reached, corresponding to a desired terminal pressure, to prevent premature plugging indication otherwise indicated by rising liquid level in the inlet chamber. Accurate and reliable calibration is enabled by separating the filtration function and the plugging indication function.

3 Claims, 9 Drawing Sheets

U.S. PATENT DOCUMENTS

| | | |
|---|---|---|
| 4,243,397 A | 1/1981 | Tokar et al. |
| 4,392,958 A | 7/1983 | Ganzi et al. |
| 4,464,263 A | 8/1984 | Brownell |
| 4,539,107 A | 9/1985 | Ayers |
| 4,692,175 A | 9/1987 | Frantz |
| 4,878,929 A | 11/1989 | Tofsland et al. |
| 4,882,056 A | 11/1989 | Degen et al. |
| 4,890,444 A | 1/1990 | Vander Geisen et al. |
| 4,929,354 A | 5/1990 | Meyering et al. |
| 4,950,400 A | 8/1990 | Girondi |
| 5,006,235 A | 4/1991 | Cooper |
| 5,039,413 A | 8/1991 | Harwood et al. |
| 5,071,456 A | 12/1991 | Binder et al. |
| 5,167,683 A | 12/1992 | Behrendt et al. |
| 5,238,474 A | 8/1993 | Kahlbaugh et al. |
| 5,252,207 A | 10/1993 | Miller et al. |
| 5,306,321 A | 4/1994 | Osendorf |
| 5,350,515 A | 9/1994 | Stark et al. |
| 5,364,456 A | 11/1994 | Kahlbaugh et al. |
| 5,376,278 A | 12/1994 | Salem |
| 5,415,676 A | 5/1995 | Tokar et al. |
| 5,423,892 A | 6/1995 | Kahlbaugh et al. |
| 5,427,597 A | 6/1995 | Osendorf |
| 5,454,858 A | 10/1995 | Tokar et al. |
| 5,462,679 A | 10/1995 | Verdegan et al. |
| 5,507,942 A | 4/1996 | Davis |
| 5,622,537 A | 4/1997 | Kalbaugh et al. |
| 5,628,916 A | 5/1997 | Stevens et al. |
| 5,660,729 A | 8/1997 | Baumann |
| 5,669,949 A | 9/1997 | Dudrey et al. |
| 5,672,399 A | 9/1997 | Kahlbaugh et al. |
| 5,690,765 A | 11/1997 | Stoyell et al. |
| 5,695,637 A | 12/1997 | Jiang et al. |
| 5,700,304 A | 12/1997 | Foo |
| 5,736,044 A | 4/1998 | Proulx et al. |
| 5,762,669 A | 6/1998 | Kahlbaugh et al. |
| 5,762,670 A | 6/1998 | Kahlbaugh et al. |
| 5,766,449 A | 6/1998 | Davis |
| 5,766,468 A | 6/1998 | Brown et al. |
| 5,779,900 A | 7/1998 | Holm et al. |
| 5,792,227 A | 8/1998 | Kahlbaugh et al. |
| 5,797,973 A | 8/1998 | Dudrey et al. |
| 5,800,581 A | 9/1998 | Geilink et al. |
| 5,800,587 A | 9/1998 | Kahlbaugh et al. |
| 5,814,219 A | 9/1998 | Friedmann et al. |
| D402,361 S | 12/1998 | Nepsund et al. |
| D404,807 S | 1/1999 | Nepsund et al. |
| 5,858,044 A | 1/1999 | Nepsund et al. |
| 5,858,224 A | 1/1999 | Schwandt |
| 5,871,557 A | 2/1999 | Tokar et al. |
| D406,315 S | 3/1999 | Rao et al. |
| D406,316 S | 3/1999 | Rao et al. |
| 5,876,601 A | 3/1999 | Geibel et al. |
| D407,808 S | 4/1999 | Nepsund et al. |
| 5,935,284 A | 8/1999 | Tokar et al. |
| RE37,165 E | 5/2001 | Davis |
| 6,540,909 B2 | 4/2003 | Smith et al. |
| 6,610,198 B1 | 8/2003 | Jiang et al. |
| 2002/0125178 A1 | 9/2002 | Smith et al. |

LIQUID FILTER WITH SEPARATE AND CALIBRATED VAPOR RELEASE

CROSS-REFERENCE TO RELATED APPLICATION

This application is a continuation of U.S. patent application Ser. No. 10/116,461, filed Apr. 4, 2002, now U.S. Pat. No. 6,641,742, which is a continuation-in-part of U.S. patent application Ser. No. 09/934,576, filed Aug. 22, 2001, now U.S. Pat. No. 6,610,198.

BACKGROUND AND SUMMARY

The invention relates to liquid filters, and more particularly to a service interval change indicator more accurately reflecting filter life.

PARENT APPLICATION

Liquid filters, including fuel filters, typically have a vertically axially extending housing having an annular filter element extending axially between top and bottom ends and having an inner hollow interior and an outer annular space between the filter element and the housing. The housing has an inlet to the annular space, and an outlet from the hollow interior. Liquid is filtered by flowing from the annular space through the filter element into the hollow interior. The annular space is viewable through the housing, e.g. through a transparent housing side wall, such that an operator or service technician can see the level of liquid in the annular space as an indication of when to replace the filter element. The higher the level of liquid in the annular space the greater the pressure drop across the filter element and hence the greater the plugging of the filter element.

In many applications, the liquid or fuel level, including the rise thereof in the noted annular space, does not accurately reflect filter life. For example, in one application, fuel level in a clear housing reaches the top with 2" Mercury, Hg, (68,000 dyne/cm$^2$), restriction, while the filter element is capable of 8" Mercury (271,000 dynelcm$^2$), restriction. Hence, using fuel level in the noted annular space of the clear housing as an indicator to change the filter element results in a premature such change. This is objectionable because of the less than full life usage of the filter element, the more frequent filter element changes, and the corresponding higher overall cost thereof The invention of the -noted parent application addresses and solves the above noted objections. In one aspect, the parent invention delays the rise in liquid level in the noted annular space to correct the otherwise premature indication of a need to change the filter element. In another aspect, liquid level in the noted annular space is allowed to rise to controlled levels providing advance and more accurate indication of a forthcoming need to change the filter element.

PRESENT INVENTION

The present invention arose during continuing development efforts directed toward liquid filters, including fuel filters, including for diesel fuel, which must provide high removal efficiency and low pressure drop.

As is known, fuel filters are often used on the suction side (low pressure or vacuum side) of the fuel pump. In order to obtain reasonable service intervals without fuel starving the engine, the initial pressure drop should be under 1 inch of Mercury, Hg, (34,000 dyne/cm$^2$), with a terminal pressure drop across the filter, ΔP, in the range of 5 to 10 inches of Mercury (170,000 to 340,000 dyne/cm$^2$). Historically, plugged fuel filters are one of the leading causes for on-highway service calls for over-the-road trucks. Typically, the filters are plugged with soft contaminants, e.g., asphaltenes, biological growth, resins, or other sludge-type material, often introduced as a result of fuel transportation and handling. At the same time, truck operators are under economic pressure to reduce costs, including maintenance costs due to scheduled and unscheduled maintenance and replacement filters. It is thus desirable for operators to be able to fully utilize the contaminant-holding capacity of filters (i.e. not change out the filters too soon), without actually plugging the filter and jeopardizing engine operation. To do this, they must be able to accurately detect filter plugging. In the past, a variety of gages and sensors have been utilized to monitor pressure drop across the filter, however these are expensive, not always reliable, and are often ignored by operators. Another common technique is to use air/fuel vapor in the fuel filter housing as a visual indicator of element condition. In the air visualization method, the disappearance of the air is erroneously assumed to be an indicator of filter plugging. The underlying premise for this method is the observation that, in practice, air carried along with the fuel tends to collect in the top of the filter housing. This air pocket is commonly observed with new filters and not with plugged filters. The air visualization method is relatively popular, in that it is inexpensive, easy and, if used regularly, minimizes problems resulting from waiting too long to change the filter. On the other hand, the method is inaccurate and leads to premature, costly filter changes.

The present invention addresses and provides further solutions to the above noted objections. In one aspect, the invention provides an improved air visualization method and mechanism avoiding the above noted source of inaccuracy. In one form, this is accomplished by separating the filtration and indication functions. Various embodiments of the latter are provided.

BRIEF DESCRIPTION OF THE DRAWING

Parent Application

FIG. 1 is a side elevation view of a liquid filter known in the prior art.

FIG. 2 is a sectional view taken along line 2—2 of FIG. 1.

FIG. 3 is a perspective view of a filter element in accordance with the parent invention.

FIG. 4 is a view like FIG. 1 but incorporating the filter element of the parent invention.

FIG. 5 is a view like FIG. 3 and shows a further embodiment.

FIG. 6 is a view like FIG. 2 but incorporating the filter element of FIG. 5.

FIG. 7 is like FIG. 6 and shows a further stage of operation.

FIG. 8 is like FIG. 5 and shows a further embodiment.

PRESENT INVENTION

Figure 9:
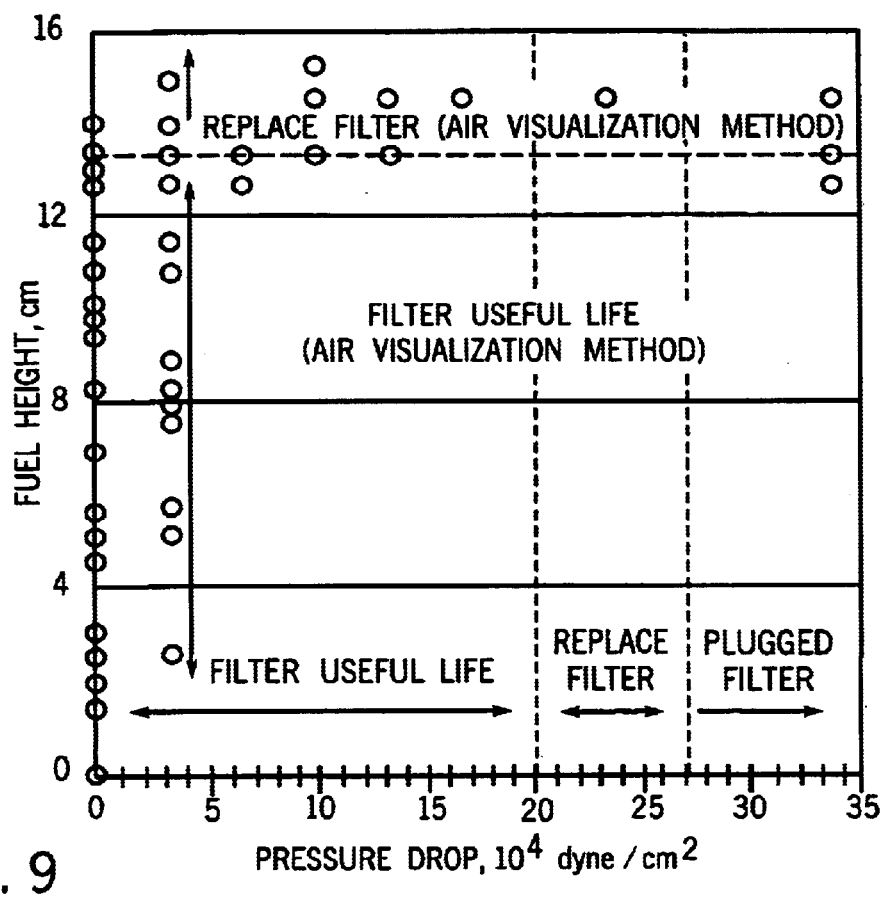

FIG. 9 is a graph showing field test data for fuel filters known in the prior art.

Figure 3:
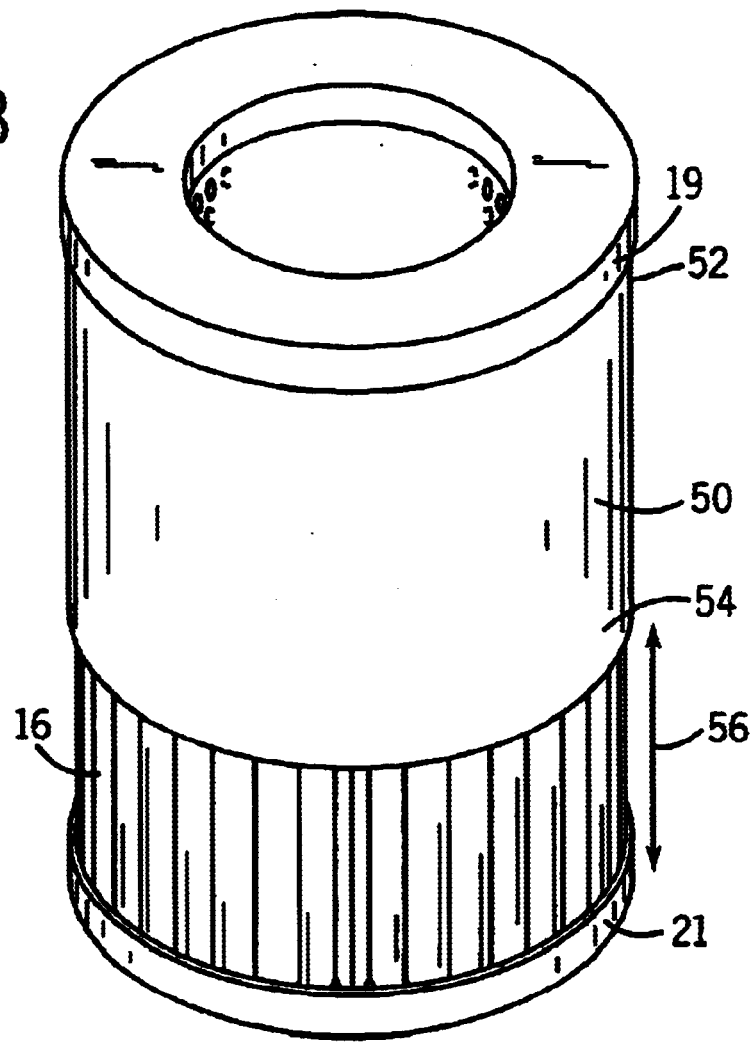
Figure 4:
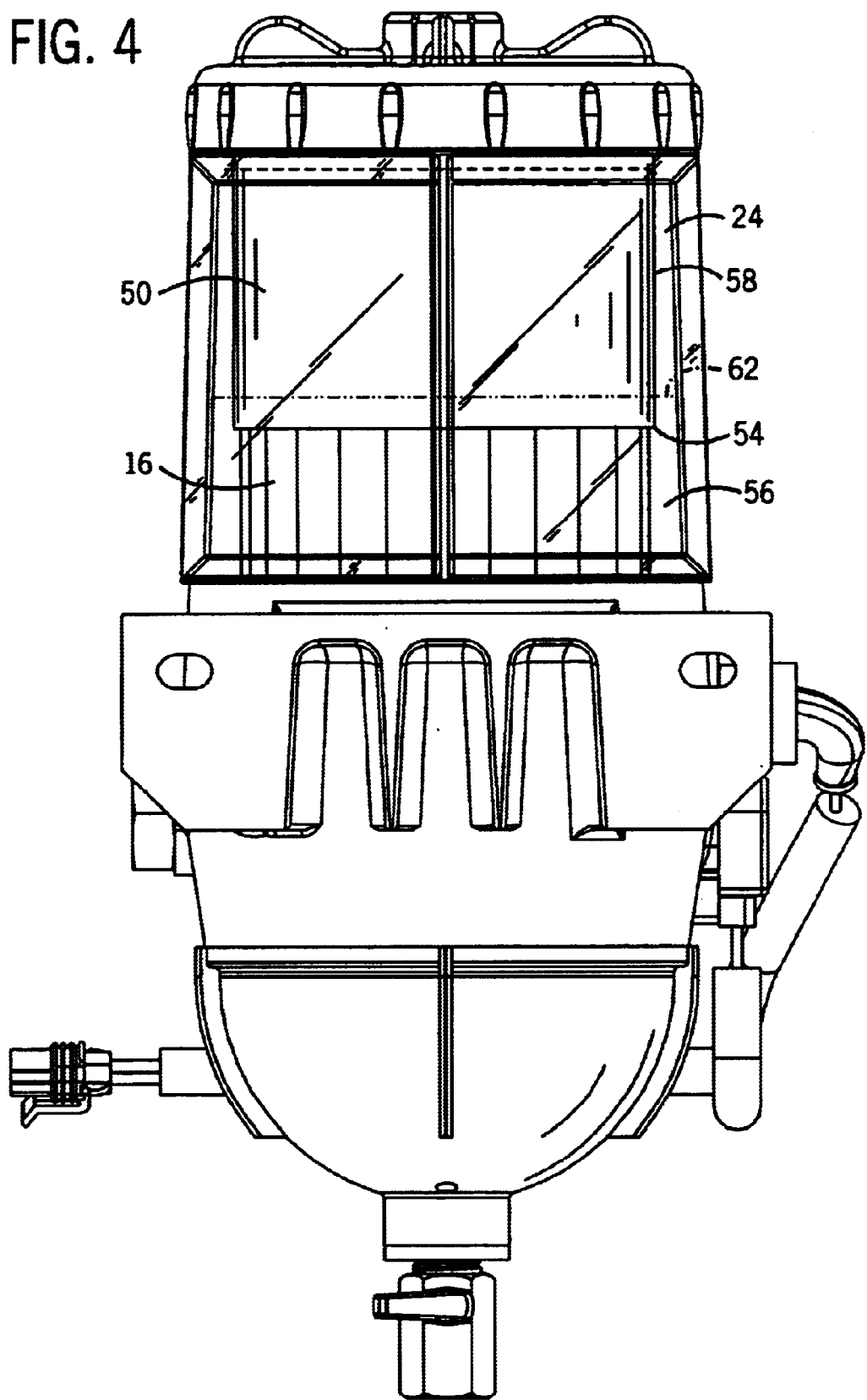
Figure 10:
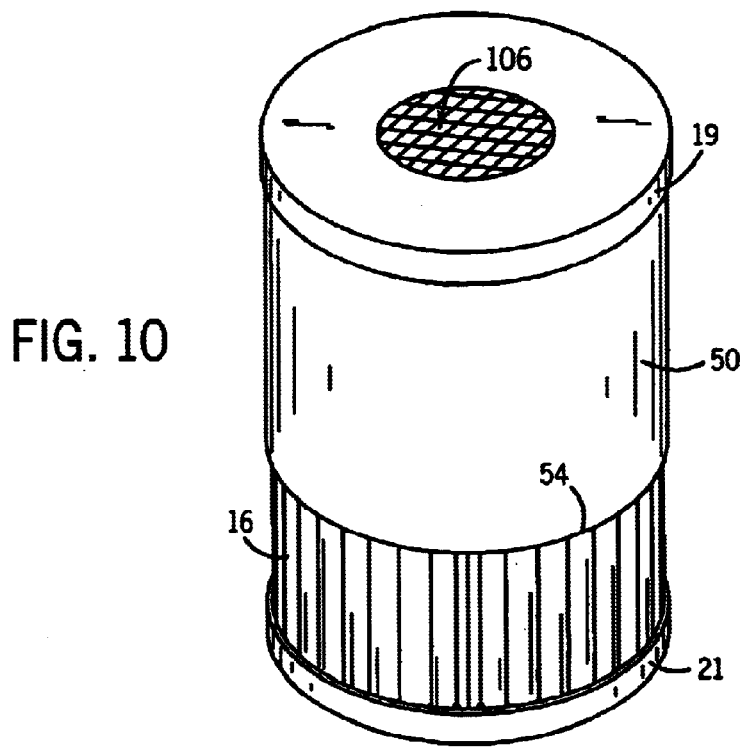

FIG. 10 is a view like FIG. 3 and shows a filter element in accordance with the present invention.

Figure 6:
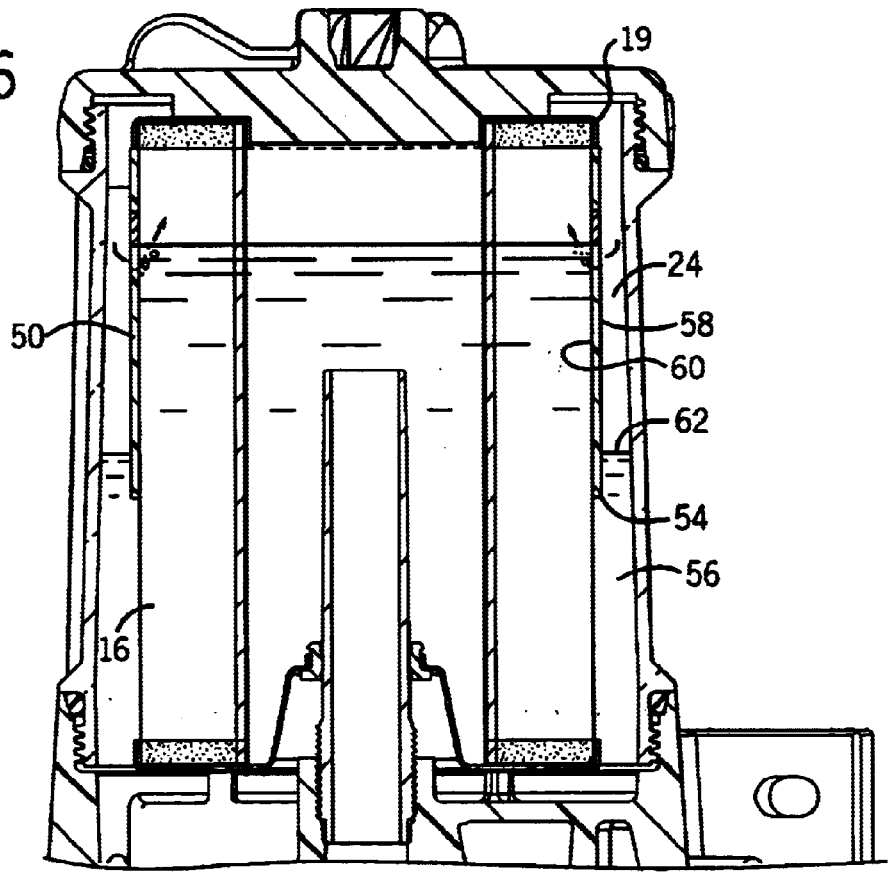
Figure 7:
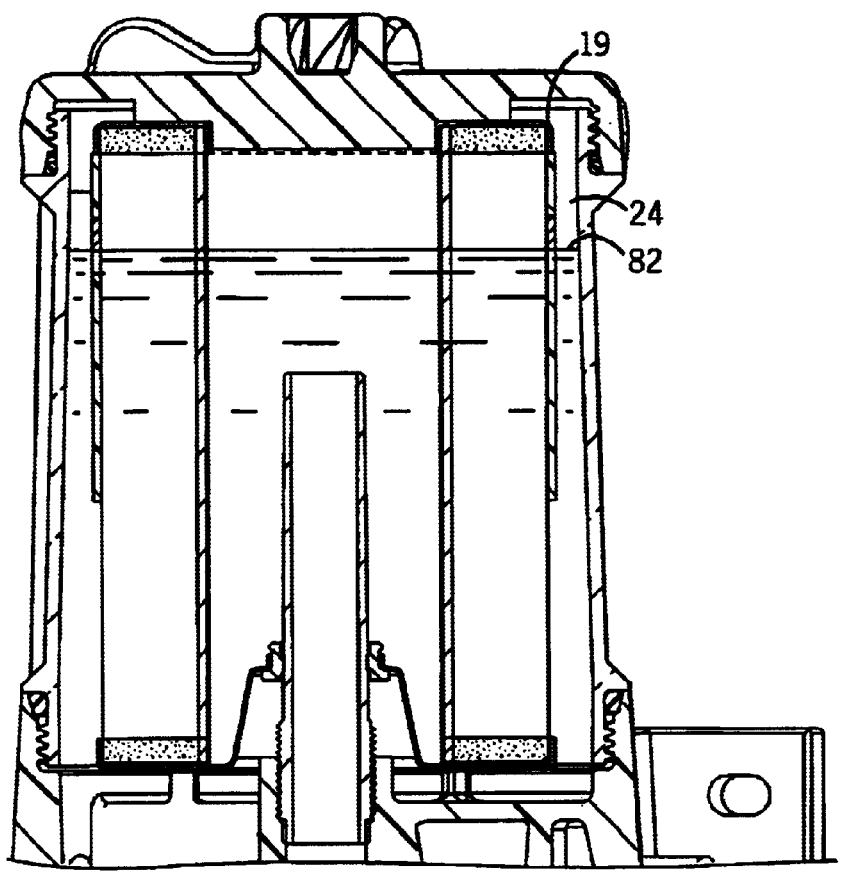
Figure 11:
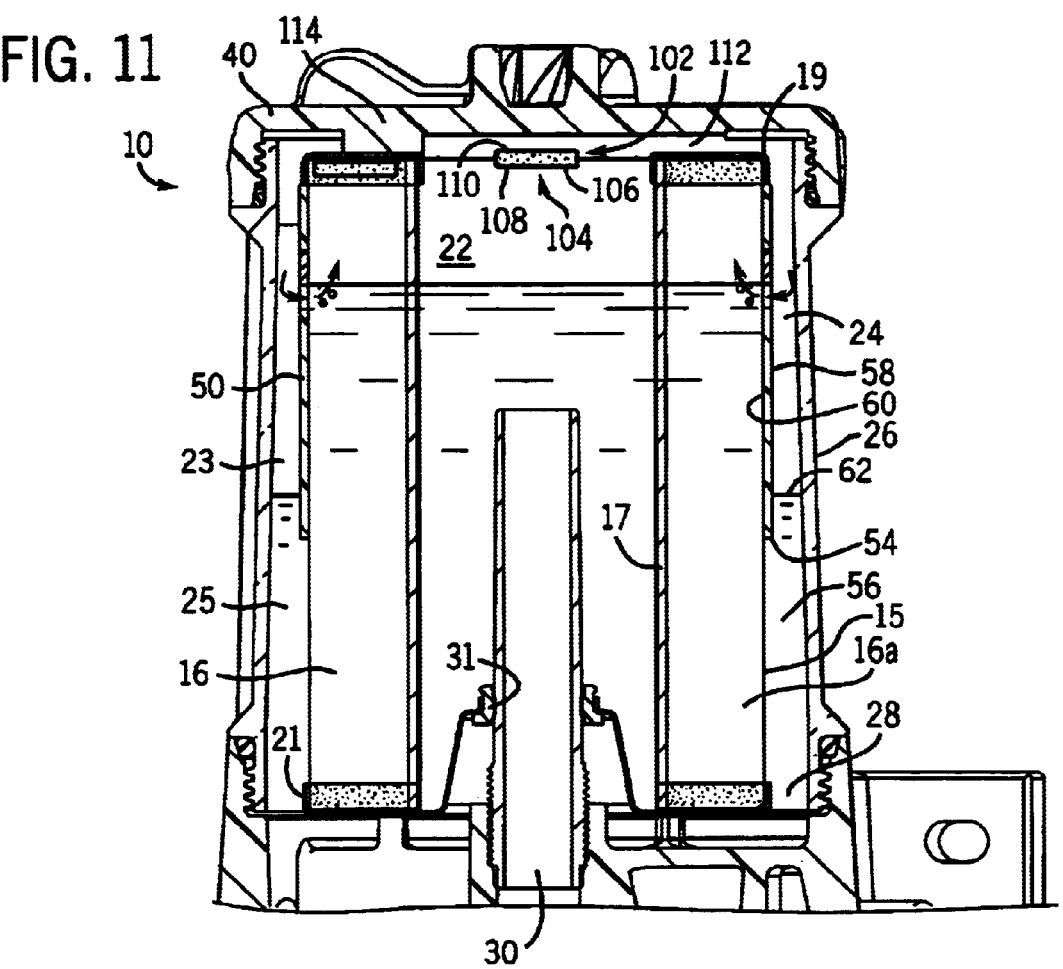

FIG. 11 is a view like FIG. 6 but incorporating the filter element of FIG. 10.

Figure 12:
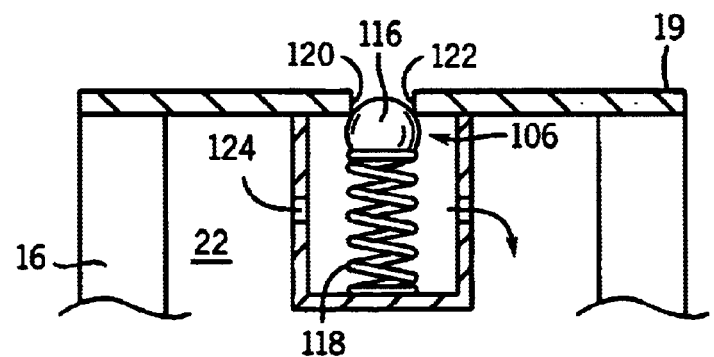

FIG. 12 is a view like portion of FIG. 11 and shows a further embodiment.

Figure 13:
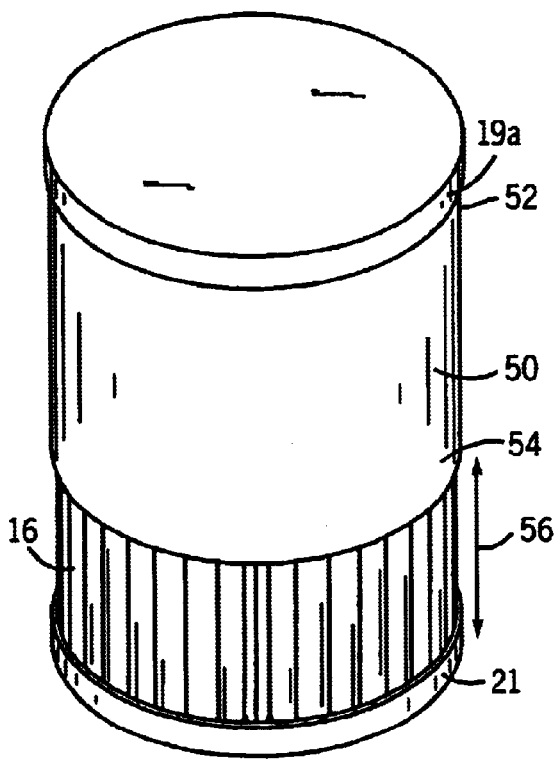

FIG. 13 is a view like FIG. 10 and shows a further embodiment.

Figure 14:
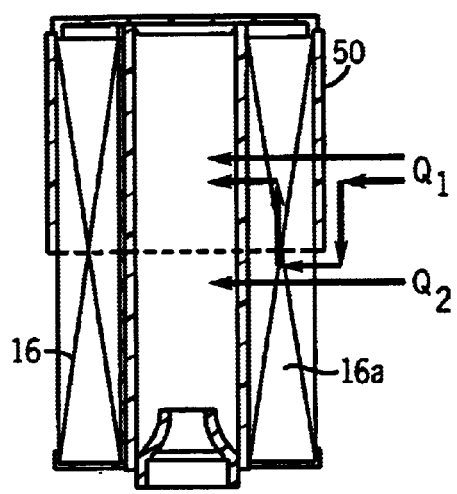

FIG. 14 is a schematic illustration of a filter element in accordance with the invention, illustrating operation.

Figure 15:
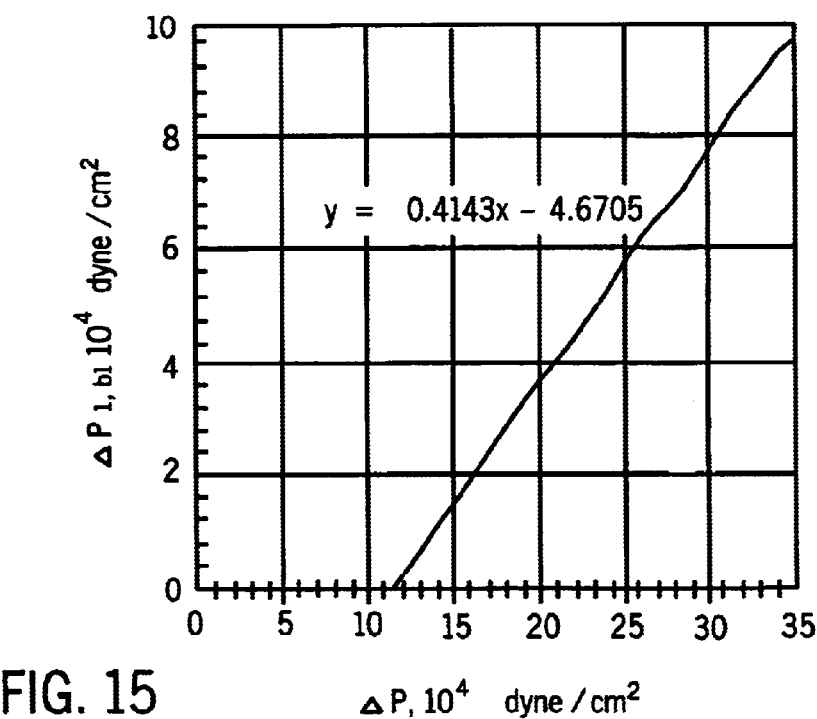

FIG. 15 is a graph illustrating performance.

DETAILED DESCRIPTION OF THE INVENTION

PARENT APPLICATION

The following description regarding FIGS. 1–8 is taken from parent U.S. patent application Ser. No. 09/934,576.

PRIOR ART

Figure 1:
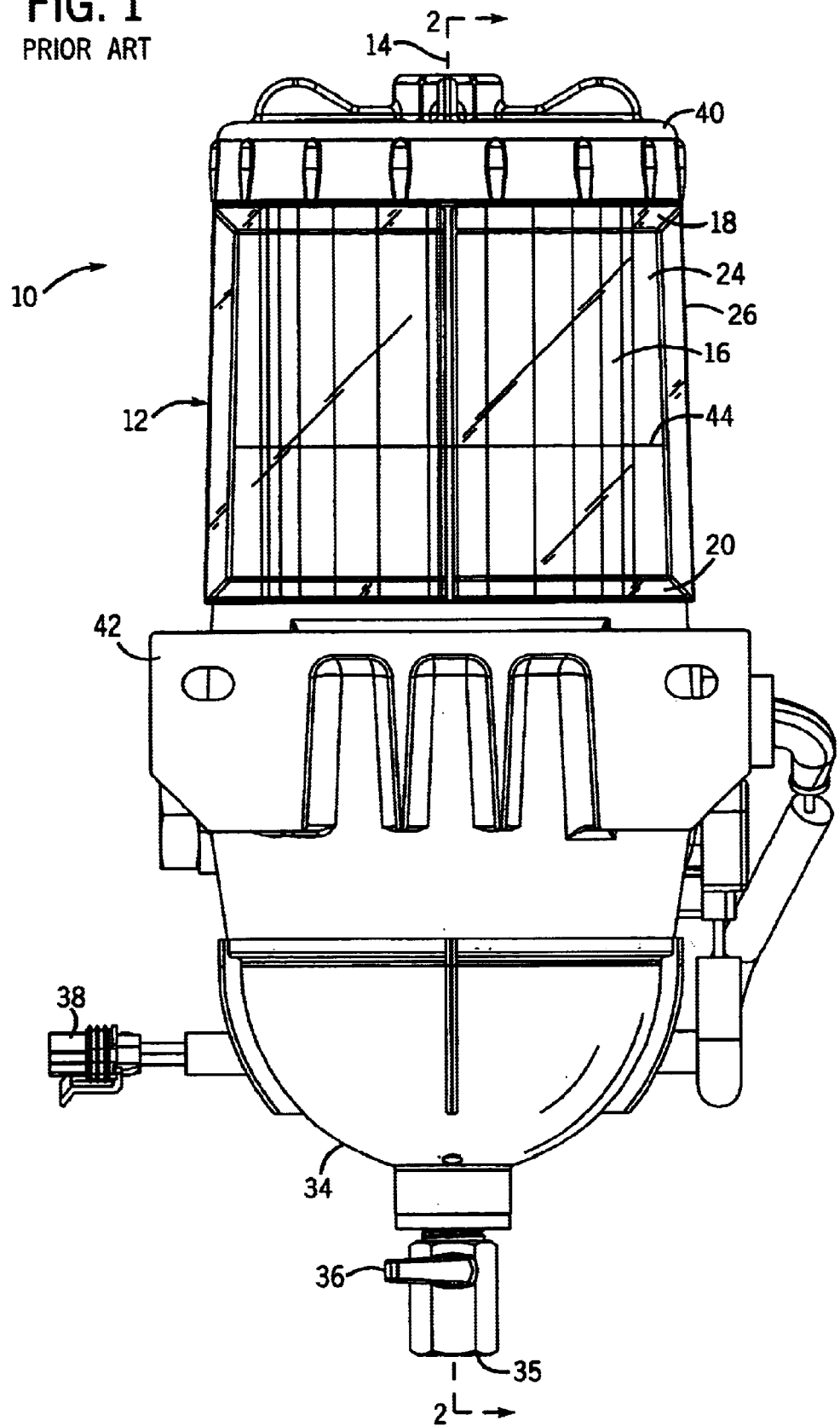
FIGS. 1–8 are taken from parent U.S. patent application Ser. No. 09/934,576.
Figure 2:
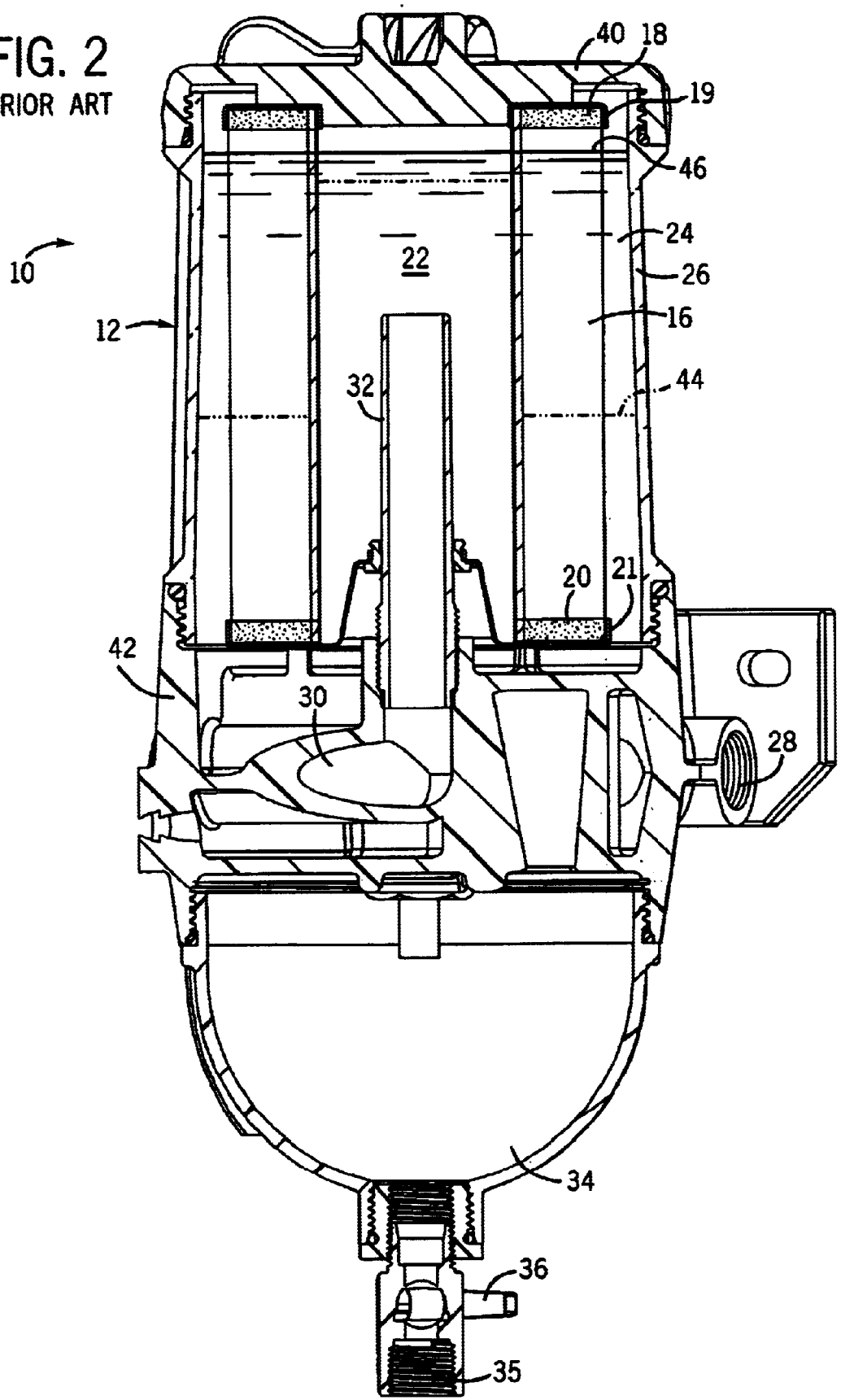

FIG. 1 shows a liquid filter 10, for example a diesel fuel filter, known in the prior art. The filter includes a housing 12 extending along a generally vertical axis 14 and having an annular filter element 16 extending axially between top and bottom ends 18 and 20 at respective upper and lower end caps 19 and 21, FIG. 2, and having an inner hollow interior 22, FIG. 2, and an outer annular space 24 between filter element 16 and side wall 26 of housing 12. The housing has a lower inlet 28, FIG. 2, to annular space 24, and a lower outlet 30 from hollow interior 22 through outlet tube 32. In the case of a diesel fuel filter, the housing may include a lower collection bowl or reservoir 34 for collecting coalesced separated water or contaminants for drainage at drain outlet 35 as controlled by valve 36, and may have an electrical connection 38 for an internal heater, and so on, as is known.

Housing 12 includes the noted cylindrical sidewall 26 closed at its top end by upper end cap 40 in threaded relation, and closed at its bottom end at housing base 42 in threaded relation. Sidewall 26 is clear or transparent, and hence annular space 24 is viewable through the housing such that an operator or service technician can see the level of liquid such as 44, FIG. 1, in annular space 24. When the liquid rises from level 44, as shown in dashed line in FIG. 2, to level 46, the operator or service technician can see such level and the change thereof as an indication of when to replace filter element 16. The higher the level of liquid in annular space 24 the greater the pressure drop across filter element 16 and hence the greater the plugging of filter element 16. Unfortunately, it has been found in numerous applications that such liquid level rise from 44 to 46 does not correspond to expired filter life. Hence, the filter element is being changed prematurely, and has a longer life than otherwise indicated by the noted rising liquid level in annular space 24.

PARENT INVENTION

FIGS. 3–8 illustrate the parent invention and use like reference numerals from above where appropriate to facilitate understanding. The parent invention is illustrated in the context of the above noted known diesel fuel filter, though the parent invention is not limited thereto.

The parent invention delays the rise of fluid level in annular space 24 for applications where filter element 16 is otherwise changed prematurely and has a longer life than otherwise indicated by the noted rising liquid level in annular space 24. The liquid gives off vapor in the housing, including in annular space 24. This aspect is utilized in the parent invention. The noted delay is provided by a delay member in the form of a vapor and liquid impermeable sleeve 50 around filter element 16 and having a top end 52 at the top end of the filter element and having a bottom end 54 spaced from the bottom end of the filter element by an axial gap 56. The sleeve has an outer face 58, FIGS. 4, 6, facing annular space 24, and an inner face 60 facing filter element 16. Liquid and vapor flow from annular space 24 radially inwardly through axial gap 56 and radially inwardly through filter element 16 thereat, and also flow axially along inner face 60 of sleeve 50 and radially inwardly through filter element 16 thereat. When the liquid level in annular space 24 rises above bottom end 54 of sleeve 50, as shown at level 62, FIGS. 4, 6, vapor above level 62 can no longer flow through axial gap 56 and is trapped in annular space 24 above bottom end 54 of sleeve 50 due to the vapor impermeability of sleeve 50. Further rise of liquid level in annular space 24 must compress trapped vapor therein, thus slowing and delaying the rise of liquid level in annular space 24.

Figure 5:
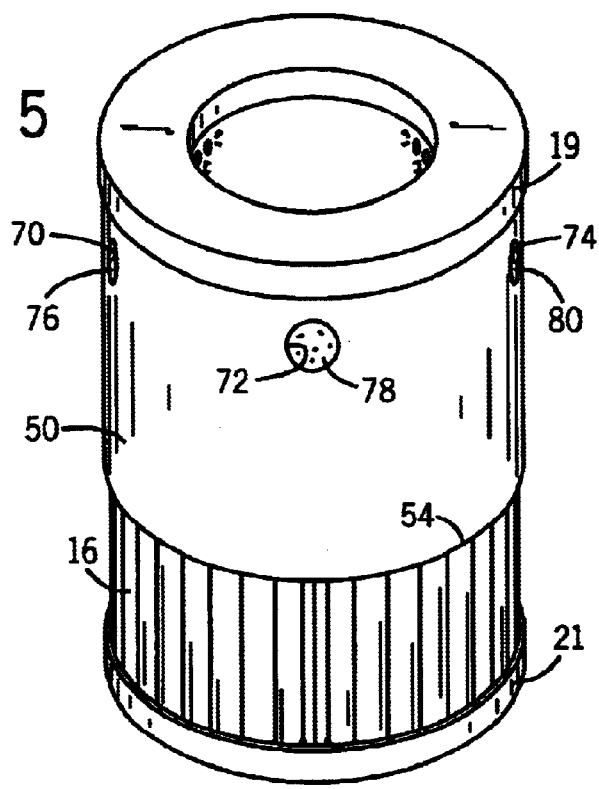

In a further embodiment, FIG. 5, sleeve 50 has one or more apertures therein such as 70, 72, 74, etc. at respective given locations therealong, each having a respective liquid-soluble button 76, 78, 80, respectively, for example a fuel-soluble button made of polyisobutylene, for example available from Lubrizol under Part Number OS158536. The button initially closes the respective aperture, and then is dissolved after a given time by contact with the liquid flowing along inner face 60 of sleeve 50, such that vapor in annular space 24 may pass through the aperture vacated by the button, FIG. 6, whereafter the liquid level rises in annular space 24 from level 62, FIG. 6, to level 82, FIG. 7. The noted given time is preferably selected to be the filter element change interval, e.g. by matching dissolution rate of the material and/or thickness to the desired interval. Upon dissolution of the button and passing of vapor from annular space 24 through the respective aperture in sleeve 50, the rising liquid level in annular space 24 provides an indication to the operator to change filter element 16.

Figure 8:
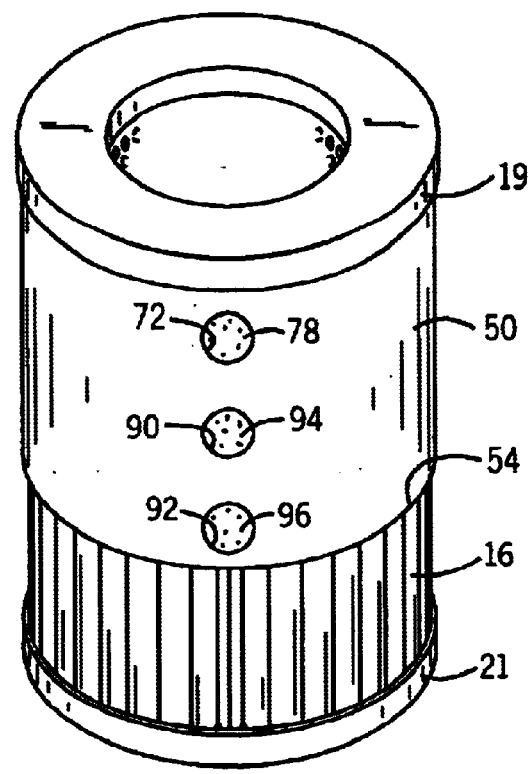

In a further embodiment, FIG. 8, sleeve 50 has a further plurality of apertures such as 90, 92 each filled with a respective liquid-soluble button 94, 96 and axially spaced from bottom end 54 of sleeve 50 by differing axial spacings. Buttons 96, 94, 78 have differing dissolution rates, e.g. by differing thicknesses and/or differing material selection. A first of the buttons such as 96 closest to bottom end 54 of sleeve 50 has the fastest dissolution rate and dissolves first such that liquid level in annular space 24 rises to a respective first aperture 92 vacated by first button 96. This provides a first advance indication of a forthcoming need for a filter element change. A second of the buttons such as 94 is spaced axially farther from bottom end 54 of sleeve 50 than first button 96 and has a slower dissolution rate and dissolves second such that the liquid level in annular space 24 further rises to a respective second aperture 90 vacated by second button 94. This provides a second sequential indication of an oncoming need for a filter element change.

PRESENT INVENTION

In the above noted prior art, the assumption underlying the noted air visualization method is that is that the increased pressure drop across the filter causes the air to pass through the filter upon plugging. The pressure drop needed for the air to flow through the filter media is given by:

$$\Delta P = \Delta P_{1,A} \qquad \text{Equation (1)}$$

where $\Delta$ is the pressure drop across the filter element (at plugging in this case) and $\Delta P_{1,A}$ is the capillary pressure required for air to flow through the filter media, as given by the LaPlace Equation, also known as the bubble point of the media. $\Delta P_{1,A}$ is given by:

$$\Delta P_{1,A} = \frac{4\gamma \cos\theta}{D} \quad \text{Equation (2)}$$

where $\gamma$ is the surface tension of the fuel, $\theta$ is the three-phase contact angle of the filter media-fuel-air, and D is the maximum pore diameter of the filter media. At the bubble point, when air starts to displace the oil in the filter media, $\theta \approx 0°$. For typical fuel, $\gamma$ is approximately 25 dyne/cm.

In application, D corresponds to the maximum pore diameter, since air (and fuel) will flow through the least restrictive opening. All filter media has a distribution of pore sizes. As a filter plugs, there is a net decrease in the average pore size, due to contaminant capture, however the maximum pore size changes little, as most contaminant build-up occurs in the smaller pores that remove most of the contaminant. Typical fuel filter media bubble points are on the order of 25,000 dyne/cm$^2$ (0.7 inches of Mercury), corresponding to D=40 $\mu$m, while the terminal pressure drop is 170,000 to 340,000 dyne/cm$^2$ (5 to 10 inches of Mercury), corresponding to 6 $\mu$m <D. It is unlikely that these least restrictive pores would remove enough contaminant to reduce in size by a factor of 6 or more. There is no correlation between $\Delta P_{1,A}$ (the pressure drop at which the air pocket starts to disappear) and $\Delta P$ (the terminal pressure drop), as shown in FIG. 9. FIG. 9 shows the actual pressure drop across the filter (abscissa) plotted against the fuel height (traditional prior art air visualization method). The data were obtained from a field test on over-the-road trucks using two different types of diesel fuel filters. The pressure drop across the filter and fuel height were monitored during the test. According to industry standards, a filter is plugged at 271,000 dyne/cm$^2$ (8 inches of Mercury) pressure drop. At 203,000 dyne/cm$^2$ (6 inches of Mercury), it is recommended that users replace the filter as soon as practical. Using the traditional air visualization method, users would consider the filter plugged when the fuel height exceeds 13.3 cm (5.25 inches). At this height, the air pocket disappears. In the data of FIG. 9, the traditional air visualization method indicated plugging for 36 of 113 data points. However, the filter was actually plugged only 3 times and in the "replace filter" region 2 additional times. The traditional air visualization method prematurely indicated filter plugging 27% of the time. This results in premature filter replacement and added expense for engine operators, and demonstrates the inaccuracy of the traditional air visualization method.

The problem with the noted traditional air or gas visualization method is that the filtration function and the plugging indication function both occur in the filter media and are affected by the same factors. The air visualization method requires that a change in the very largest pores corresponds to what is occurring in the rest of the media. In accordance with the present invention, a way to avoid this source of inaccuracy is to separate the two functions. This is accomplished in the present invention, and provides more accurate and reliable detection of filter element plugging than the traditional air visualization method.

FIGS. 10 and 11 use like reference numerals from above where appropriate to facilitate understanding. Liquid filter 10, for example the noted diesel fuel filter, houses annular filter element 16 having an upstream outer face 15 communicating with inlet 28, and a downstream inner face 17 communicating with outlet 30. Filter element 16 filters liquid passing radially inwardly therethrough from outer face 15 to inner face 17. Housing 10 has the noted sidewall 26 which defines with outer face 15 the noted annular space or inlet chamber 24 therebetween having an upper section 23 and a lower section 25. As liquid such as fuel enters inlet chamber 24 from inlet 28, gas or air in the liquid rises to upper section 23 of inlet chamber 24. Inlet chamber 24 is viewable through the housing, as noted above as provided by a clear or transparent sidewall 26, such that an operator can see the level of liquid in inlet chamber 24. A low level of liquid indicates a low pressure drop initial non-plugged condition of filter element 16. The higher the level of liquid in inlet chamber 24 the greater the pressure drop across filter element 16 and the greater the plugging of the filter element.

A change interval plugging indicator 102 is provided in the housing by a gas trap and pressure responsive release mechanism 104 trapping gas in upper section 23 of inlet chamber 24 until a designated release pressure is reached, corresponding to a desired terminal pressure, to prevent premature plugging indication otherwise indicated by rising liquid level in the inlet chamber. The change interval plugging indicator is preferably part of the filter element and includes outer wrap 50 around outer face 15 of filter element 16 in upper section 23 of inlet chamber 24 and blocking gas flow therethrough at least at pressures below the noted designated release pressure. Outer wrap 50 has the noted lower end 54 which defines a lower end of upper section 23 of inlet chamber 24 and an upper end of lower section 25 of the inlet chamber. Gas is trapped in upper section 23 of the inlet chamber when liquid in the inlet chamber rises above lower end 54 of outer wrap 50.

Filter element 16 is the noted axially extending annulus having an outer surface providing the noted outer face 15, and having an inner surface providing the noted inner face 17 and defining inner hollow interior 22. The filter element has the noted lower axial end 21 having an opening 31 at hollow interior 22 and communicating with outlet 30. The filter element has the noted upper axial end 19. A check valve 106 is provided at the upper axial end of the filter element and has a first side 108 communicating with hollow interior 22, and a second side 110 communicating with upper section 23 of inlet chamber 24 for example through one or more radially extending gas passages 112 formed between spokes such as 114 in upper end cap 40. Spokes 114 apply axial pressure against filter element 16 holding the latter in place. Check valve 106 has a closed condition below the designated release pressure, and an open condition above the noted designated release pressure. In the embodiment of FIG. 11, check valve 106 is provided by porous media at upper axial end 19 of the filter element covering hollow interior 22 and blocking gas flow therethrough below the designated release pressure, and passing gas flow therethrough above the designated release pressure. In an alternate embodiment, FIG. 12, the check valve is provided by a biased valve member 116, such as a ball, flap, flanged stem, or the like, biased upwardly by bias member 118, such as a spring, to a normally closed condition below the noted designated pressure, e.g. as seated against and closing opening 120 at valve seat 122. The valve has an open condition overcoming the noted bias above the noted designated release pressure, e.g. to move ball 116 downwardly against the bias of spring 118 to permit gas to flow downwardly through opening 120 and through vents such as 124 into hollow interior 22.

In the embodiments of FIGS. 10–12, outer wrap 50 is preferably relatively non-porous, i.e. completely impervious to gas and liquid flow, or having a permeability substantially lower than filter element 16. In another embodiment, outer wrap 50 is a porous member wetted by the liquid in inlet chamber 24 such that capillary pressure in such porous member blocks gas flow therethrough below the noted designated release pressure, and such that pressure above such designated release pressure overcomes the capillary pressure, and gas passes through outer wrap 50, to be described. In this latter embodiment, upper end cap 19 of filter element 16 is engaged in sealing relation by upper end cap 40 of the housing, FIG. 6, such that no gas passes therebetween from inlet chamber 24 to hollow interior 22. In an alternative, FIG. 13, upper end cap 19a of filter element 16 is a solid member spanning hollow interior 22 and having no opening thereinto.

In each of the described embodiments, the gas trap and pressure responsive release mechanism delays rise in liquid level in inlet chamber 24 for applications where filter element 16 is changed prematurely and has a longer life than otherwise indicated by rising liquid level in inlet chamber 24. Filter media 16a of filter element 16 performs a filtration function by passing liquid therethrough. During use, liquid level in inlet chamber 24 rises, and gas in the inlet chamber disappears as permitted by gas flow through filter media 16a. In the prior art, the rising liquid level and the disappearing gas is used for indicating a change interval for filter element 16. In this manner in the prior art, filter media 16a provides both a filtration function and a plugging indication function. The present system provides an improved gas visualization interval change plugging indication method by separating the filtration function and the plugging indication function by trapping gas in inlet chamber 24, and then releasing the gas in response to a designated release pressure corresponding to a desired terminal pressure. During use, the pressure drop across filter media 16a increases as the latter becomes more restrictive to liquid flow therethrough as more contaminant is captured. In the present invention, the designated release pressure is independent of and does not vary with the increasing restriction of filter media 16a to liquid flow therethrough. The filtration function is performed with a first member provided by filter media 16a. The plugging indication function is performed with a second member different than the noted first member. In preferred form, the noted second member is provided by outer wrap 50 and in some embodiments also in combination with check valve 106. The flow properties of the first member 16a vary during filtration. The flow properties of the second member 50 do not substantially vary during filtration. In one preferred embodiment, the second member is provided by outer wrap 50 around outer face 15 of filter element 16, the outer wrap having a lower permeability than filter media 16a, and wherein the designated release pressure is calibrated to correspond to the noted desired terminal pressure according to bubble point of the outer wrap, to be described. The noted gas trap and pressure responsive release mechanism 104 traps gas in inlet chamber 24 until the noted designated release pressure corresponding to the noted desired terminal pressure is reached, and then releases the gas to escape to outlet 30 through gas passage 112 and hollow interior 22, and/or through outer wrap 50 and filter media 16a and hollow interior 22, to outlet 30, which escaping gas is replaced by increasing liquid levels in inlet chamber 24, indicating that the designated release pressure corresponding to the desired terminal pressure has been reached, which in turn indicates that replacement of filter element 16 is due.

FIG. 14 is a schematic illustration and uses like reference numerals from above where appropriate to facilitate understanding. Fuel can flow around outer wrap 50 and through filter media 16a. An air pocket forms and is maintained outside the outer wrap, where it can be detected visually if a transparent housing or sight glass is used. For discussion and modeling purposes, the element is divided into two sections: Section 1 (the portion above lower end 54 of outer wrap 50) and Section 2 (portion below end 54). The advantage of this invention, compared to the prior art air visualization method, is that the use of an outer wrap separates the filtration function (of the filter media) from the plugging detection function. It uses capillary pressure to prevent air flow until the terminal pressure drop is achieved. Unlike the prior art air visualization method, the properties of the outer wrap do not change significantly as filtration occurs, and an accurate determination for filter plugging can be made. In contrast, the prior art air visualization method requires that a change in the very largest pores corresponds to what is occurring in the rest of the media.

Section 1 refers to the portion of the filter element covered by the outer wrap. First, we assume that the axial variation in flow rate, pressure and pressure drop across the filter media in this section is negligible. Based on this assumption, the pressure drop across the filter element ($\Delta P$) is given by the following equation:

$$\Delta P = \Delta P_{1,B} + \Delta P_{1,A} \qquad \text{Equation (3)}$$

where $\Delta P_{1,B}$ is the pressure drop caused by the outer wrap, and $\Delta P_{1,A}$ is the pressure drop across the filter media In the initial state of the filter, $\Delta P_{1,B}$ is due to the restriction across the outer wrap and to the restriction caused by flow through the channel formed between the filter media and the outer wrap. These two contributions are lumped together. For purposes of what we are trying to achieve, it is not critical to distinguish between them, as can be seen later. It is noteworthy that in this initial state, there is no airflow through the outer wrap. $\Delta P_{1,A}$ is due to the pressure drop across the new media. In the final state of the filter, at the precise moment when air flows through the outer wrap, $\Delta P_{1,B}$ is equal to the bubble point of the outer wrap in the specific fuel, and $\Delta P_{1,A}$ is due to the pressure drop across the plugged media.

Section 2 refers to the portion of the filter element uncovered by the outer wrap. Again, we assume that the axial variation in flow rate, pressure and pressure drop across the filter media in this section is negligible (a more accurate assumption in this section compared to section 1). The pressure drop across the filter element is given by the following equation:

$$\Delta P = \Delta P_{2,A} \qquad \text{Equation (4)}$$

where $\Delta P_{2,A}$ is the pressure drop across the filter media. In the initial state of the filter, $\Delta P_{2,A}$ is due to the pressure drop across the new media. In the final state of the filter, $\Delta P_{2,A}$ is equal to the pressure drop across the plugged media. It is noteworthy that $\Delta P_{1,A} \neq \Delta P_{2,A}$ in neither the initial nor final state, as the flow through section 1 also includes restriction contributions from the outer wrap and channel.

Now considering the filter element s a whole assuming constant total flow rate through the filter element, the total flow rate (Q) is given by:

$$Q = Q_1 + Q_2 \qquad \text{Equation (5)}$$

where $Q_1$ is the flow rate through section 1, and $Q_2$ is the flow rate through section 2. As the filter plugs, $Q_2/Q$ decreases, $Q_1/Q$ increases, and both $\Delta P_{1,A}$ and $\Delta P_{2,A}$ increase. One implication of this is that different amounts of contaminant (per unit area) will accumulate on each section of filter media. At the moment when air starts to flow through the outer wrap, $\Delta P_{1,B}$ due to fuel flow through the outer wrap and channel equals the bubble point of the outer wrap in the specific fuel.

The challenge is to relate $\Delta P_{1,B}$ to the terminal $\Delta P$ in state 2, i.e., the terminal pressure drop of the plugged filter. The following focuses on state 2:

$$\Delta P = \Delta P_{2,B} + \Delta P_{1,A} \qquad \text{Equation (6)}$$

$$\Delta P_{1,A} = \frac{Q_1 R_1}{A_1} \qquad \text{Equation (7)}$$

where $R_1$ is a resistance coefficient for the plugged filter media, and $A_1$ is the cross-sectional (face) area of section 1 filter media. $R_1$ is a function of the media properties, contaminant and amount of contaminant deposited. In section 2, $$\Delta P = \Delta P_{2,A} = \frac{Q_2 R_2}{A_2} \qquad \text{Equation (8)}$$

where $R_2$ is a resistance coefficient for the plugged filter media, and $A_2$ is the cross-sectional (face) area of section 2 filter media. $R_2$ is a function of the same factors as $R_1$. As an approximation, assume $A_1 = A_2$. In the plugged state, virtually all of the filter media in both sections will be used, so if we start out with $A_1 = A_2$, this is a reasonable approximation. As mentioned previously, different amounts of contaminant per unit area will accumulate on the filter media in sections 1 and 2. Since the flow through section 1 increases (and hence the amount of contaminant deposited on the media) as section 2 plugs, these differences are not expected to be great and we can assume that $R_1 \approx R_2$. Hence, $$\frac{R_1}{A_1} = \frac{R_2}{A_2} = \frac{\Delta P}{Q_2} \qquad \text{Equation (9)}$$

$$\Delta P = \Delta P_{1,B} + \frac{Q_1 \Delta P}{Q_2} \qquad \text{Equation (10)}$$

This equation shows that the bubble point of the outer wrap is a function of the terminal pressure drop and the ratio of flow rates through the two sections. Conversely, the flow rate ratio is a function of $\Delta P_{1,B}$ and $\Delta P$ (as well as test conditions e.g., flow rate, fluid, contaminant), as shown by the rearranged equation:

$$\frac{Q_1}{Q_2} = \frac{(\Delta P - \Delta P_{1,B})}{\Delta P} = 1 - \frac{\Delta P_{1,B}}{\Delta P} \qquad \text{Equation (11)}$$

The model, thus far, yields expected behavior. As shown, the flow rate ratio ($Q_1/Q_2$) is always less than 1 and increases with increasing terminal pressure drop, as expected. At very low $\Delta P$, $<\Delta P_{1,B}$, the pressure drop is not high enough to force air flow through the outer wrap and there is, by definition, no terminal pressure drop achieved.

From a design standpoint, we need to know how the flow rate ratio relates to terminal pressure drop. By running experiments, in which the outer wrap is varied (hence, $\Delta P_{1,B}$), but not the filter media, filter design, or contaminant, the relationship between $\Delta P$ and $\Delta P_{1,B}$ can be determined and used to select an outer wrap corresponding to the predetermined terminal pressure drop, as shown in FIG. 15. The results are noteworthy in that they show that the terminal pressure drop increases with increasing outer wrap bubble point, as predicted by the model. Further, they show that outer wraps can be chosen based on bubble point and used as reliable indicators of element plugging at predetermined pressure drops, unlike the prior art air visualization method. For simplicity, linear regression is used to describe the relationship between $\Delta P$ and $\Delta P_{1,B}$ in the figure. It is interesting to note that the X-intercept of the regression is a reasonable approximation of the initial, clean pressure drop across the filter media under the test conditions, as expected.

It is recognized that various equivalents, alternatives and modifications are possible within the scope of the appended claims. For example, as in the parent application, annular includes other closed-loop configurations, such as ovals, racetracks, etc.

What is claimed is:

1. A liquid filter comprising a housing having an inlet and an outlet, a filter element in said housing and having an upstream outer face communicating with said inlet, and a downstream inner face communicating with said outlet, said filter element filtering liquid passing therethrough from said outer face to said inner face, said housing having a sidewall which defines with said outer face an inlet chamber therebetween having an upper section and a lower section, such that as liquid enters said inlet chamber from said inlet, gas in said liquid rises to said upper section of said inlet chamber, a low level of liquid indicating a low pressure drop non-plugged condition of said filter element, the higher the level of said liquid in said inlet chamber the greater the pressure drop across said filter element and the greater the plugging of said filter element, a change interval plugging indicator in said housing comprising a gas trap and pressure responsive release mechanism trapping said gas in said upper section of said inlet chamber until a designated release pressure is reached, corresponding to a desired terminal pressure, to prevent premature plugging indication otherwise indicated by rising liquid level in said inlet chamber, said change interval plugging indicator comprising an outer wrap around said outer face of said filter element in said upper section of said inlet chamber and blocking gas flow therethrough at least at pressures below said designated release pressure, said outer wrap having a lower end which defines a lower end of said upper section of said inlet chamber and an upper end of said lower section of said inlet chamber, wherein said gas is trapped in said upper section of said inlet chamber when liquid in said inlet chamber rises above said lower end of said outer wrap, said filter element being an axially extending annulus having an outer surface providing said outer face, and having an inner surface providing said inner face and defining a hollow interior, said filter element having a lower axial end having an opening at said hollow interior and communicating with said outlet, said filter element having an upper axial end closed by an end cap spanning said hollow interior, said end cap having a section of porous media over said hollow interior, said porous media having a lower first side communicating with said hollow interior, and having an upper second side communicating with said upper section of said inlet chamber, said porous media blocking gas flow therethrough below said designated release pressure, and passing gas flow therethrough above said designated release pressure wherein said designated release pressure corresponding to said desired terminal pressure is calibrated according to bubble point of said porous media.

2. The liquid filter according to claim 1 wherein said housing has an upper end cap having a plurality of spokes forming one or more radially extending gas passages therebetween, said spokes engaging said end cap of said filter element and applying axial pressure thereagainst holding said filter element in place, said upper second side of said porous media communicating through said one or more radially extending gas passages with said upper section of said inlet chamber.

3. In a liquid filter comprising a housing having an inlet and an outlet, a filter element in said housing and having an upstream outer face communicating with said inlet, and a downstream inner face communicating with said outlet, said filter element filtering liquid passing therethrough from said outer face to said inner face, said housing having a sidewall which defines with said outer face an inlet chamber therebetween having an upper section and a lower section, such that as liquid enters said inlet chamber from said inlet, gas in said liquid rises to said upper section of said inlet chamber, a low level of liquid indicating a low pressure drop non-plugged condition of said filter element, the higher the level of said liquid in said inlet chamber the greater the pressure drop across said filter element and the greater the plugging of said filter element, such that during use, liquid level in said inlet chamber rises and gas disappears as permitted by gas flow through said filter element, the rising of said liquid level and the disappearing of said gas being used in the prior art for indicating a change interval for the filter element, whereby said filter media provides both a filtration function and a plugging indication function in the prior art, an improved interval change plugging indication method comprising separating said filtration function and said plugging indication function by trapping gas in said inlet chamber and releasing said gas in response to a designated release pressure corresponding to a desired terminal pressure, and comprising performing said filtration function with a first member provided by said filter element, and performing said plugging indication function with second and third members different than said first member, and comprising providing said second member by an outer wrap around said filter element in said upper section of said inlet chamber and blocking gas flow therethrough at least at pressures below a designated release pressure, corresponding to a desired terminal pressure, said outer wrap having a lower end which defines a lower end of said upper section of said inlet chamber and an upper end of said lower section of said inlet chamber, wherein gas is trapped in said upper section of said inlet chamber when liquid in said inlet chamber rises above said lower end of said outer wrap, said filter element being an axially extending annulus having an outer surface and having an inner surface defining a hollow interior, said filter element having a lower axial end having an opening at said hollow interior and communicating with said outlet, said filter element having an upper axial end closed by an end cap spanning said hollow interior, and comprising providing said third member by a section of porous media in said end cap of said filter element over said hollow interior, said porous media having a lower first side communicating with said hollow interior, and having an upper second side communicating with said upper section of said inlet chamber, said porous media blocking gas flow below said designated release pressure, and passing gas flow therethrough above said designated release pressure, said method further comprising calibrating said designated release pressure corresponding to said desired terminal pressure according to bubble point of said porous media.

* * * * *